United States Patent

[11] 3,630,631

| [72] | Inventor | Julius J. Becker<br>Saginaw, Mich. |
| --- | --- | --- |
| [21] | Appl. No. | 815,168 |
| [22] | Filed | Apr. 10, 1969 |
| [45] | Patented | Dec. 28, 1971 |
| [73] | Assignee | B & K Tool & Die Corporation<br>Saginaw, Mich. |

[54] PISTON RING MACHINE FEED COMPENSATOR
19 Claims, 8 Drawing Figs.

[52] U.S. Cl. ..................................... 408/19,
82/2, 408/54, 408/64
[51] Int. Cl. ..................................... B23b 19/00
[50] Field of Search .......................... 77/3; 82/2;
408/3

[56] References Cited
UNITED STATES PATENTS
3,165,011  1/1965  Kelly .......................... 77/3

*Primary Examiner*—Andrew R. Juhasz
*Assistant Examiner*—Leon Gilden
*Attorney*—Learman, Learman & McCulloch ABSTRACT: Apparatus for machining stacked workpieces wherein a stack is presented to a work station where individual workpieces are machined. The workpieces are yieldably mounted on a carriage which sequentially moves toward and away from the work station. Yieldable means operates to eject one of the workpieces on the end of the stack when the carriage is moved away from the work station. Fluid motor indexing means may be provided to control the yieldable means. Spherical bearing means may be utilized for transmitting force between the yieldable means and the stack of workpieces. A gauge may suitably be provided to regulate the movement of the members which clamp the stack at the work station.

INVENTOR
JULIUS J. BECKER
BY
Learman, Learman & McCulloch

INVENTOR
JULIUS J. BECKER
BY
Learman, Learman & McCulloch

PISTON RING MACHINE FEED COMPENSATOR

This invention relates to an apparatus for machining stacked workpieces of nearly uniform thickness and more particularly to the machining of successive workpieces arranged in a stack and fed one by one to a work station in such manner that each workpiece, regardless of its actual thickness, is positioned precisely relatively to the machine tool or tools.

In the manufacture of high production workpieces it is customary to allow tolerances of several thousandths of an inch for each workpiece. Thus, if a piston ring, for example, should have a basic axial thickness size of 0.125 inch, the allowable tolerance limits may enable rings of 0.127 inch thickness to be acceptable. In other words, the thickness of individual workpieces may vary within certain limits and still be usable. Owing to the allowable tolerances to which individual workpieces may be manufactured, the lengths of two such stacks of workpieces may be the same, but the axial thickness of individual workpieces in each stack may vary considerably within the tolerance limits.

When feeding a stack of workpieces to tools which are to perform certain operations such as boring and chamfering at the same station, or vice versa, it is essential that each workpiece be substantially identically axially as well as radially positioned relatively to the tool. Because of the discrepancies which exist between individual workpieces of a stack, the mechanism which is utilized to eject machined rings must be variable. A mechanism of this type must be simple, and preferably automatic, without the requirement of an individual step in the machine as a condition precedent to ejection of the ring.

It is an object of the present invention to provide an improvement in the apparatus for machining stacked workpieces as disclosed before in U.S. Pat. No. 3,165,011 issued Jan. 12, 1965, and assigned to the assignee of the present invention, the disclosure of which is incorporated herein by reference.

Another object of this invention is to provide apparatus for presenting the individual workpieces of a stack of workpieces directly to a work station in successive order and in such manner as automatically to compensate for deviation in size of such workpieces so that each workpiece will be located precisely at the work station.

Another object of the invention is to provide apparatus of the kind described wherein the workpieces of a stack need not be separated from one another prior to the machining of an individual workpiece, thereby avoiding loss of machining time.

Still another object of the invention is to provide a simplified arrangement for loading and holding workpieces a stack at a time, so as to minimize the time delay between the machining of successive stacks.

Yet another object of the invention is to provide a feeding and clamping mechanism for a stack of workpieces and which is capable of feeding the entire stack of workpieces simultaneously to and clamping the latter under uniform pressure at a work station.

A further object of the invention is to provide apparatus for feeding and clamping a stack of workpieces in a position to have the workpiece at one end of the stack machined, and including mechanism for engaging and disengaging the machining tool and the workpieces in timed relation to the feeding and clamping of the stack of workpieces.

A still further object of the invention is to provide apparatus of the kind described in the preceding paragraph wherein the feeding and clamping mechanism is operable to discharge a machined workpiece from the stack in timed relation to the feeding of the stack of workpieces.

Yet another object of the present invention is to provide apparatus for feeding and clamping a stack of workpieces and which is capable of discharging machined workpieces of different thicknesses.

A further object of the present invention is to provide apparatus for rapidly feeding and clamping a partial stack of workpieces to a work station where the end workpiece will be machined.

Briefly, according to the present invention, there is provided apparatus for successively presenting each workpiece of a stack of workpieces to a work station for machining by a tool wherein the stack is clamped by clamping means while it is being machined. Yieldable means connect the clamping means with carriage means which is sequentially driven toward and away from the work station. Indexing means moves the yieldable means which is operable in response to the carriage means moving the clamp means away from the work station so as to permit a workpiece at one end of the stack to be discharged between the clamp means.

Other objects and advantages of the invention will be pointed out specifically or will become apparent from the following description when it is considered in conjunction with the appended claims and the accompanying drawings, in which:

Figure 1:
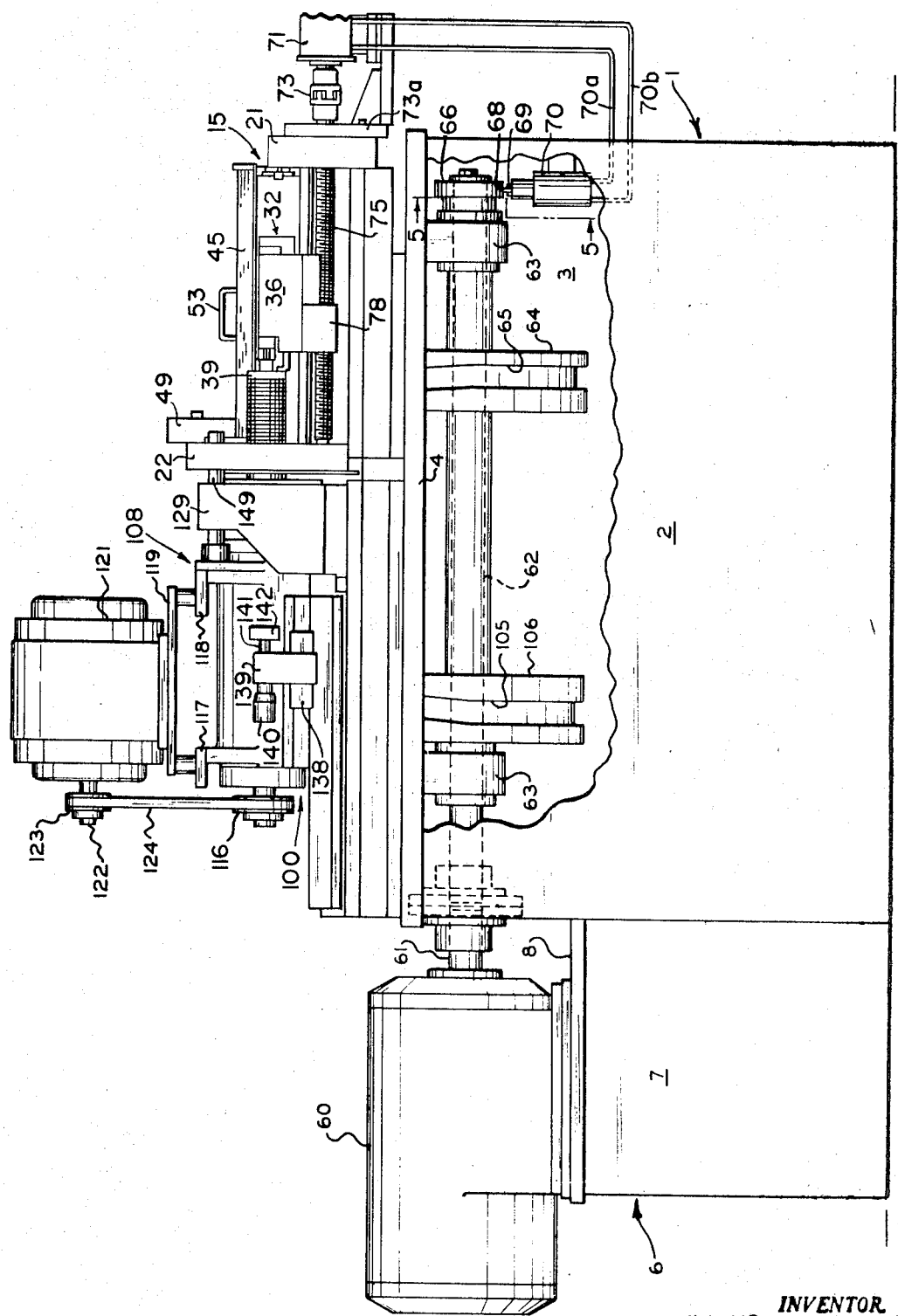
FIG. 1 is a side elevational view of apparatus constructed in accordance with the invention, with certain parts being broken away.

Apparatus constructed in accordance with the disclosed embodiment of the invention comprises a base or supporting frame structure 1 having sidewalls 2 and 3 which support a top wall 4. The top wall 4 is provided with a longitudinal slot 5 (see FIG. 2) for a purpose which presently will become apparent. Adjacent the main frame 1 is a subframe 6 having vertical walls 7 which support a top wall 8.

Mounted atop the frame member 4 and spanning the slot 5 therein is a supporting member constructed in accordance with the disclosure of the above-referenced patent and receives reciprocable carriage 15 removably mounted thereon.

The carriage 15 is also constructed in accordance with the teachings of the above-referenced patent and is provided with a drop-center section 17 (FIG. 2) to the underside of which is secured a vertical shaft 18 (FIG. 3) on which a follower roller 19 is rotatably journaled. At its rearward end the carriage 15 terminates in an upstanding wall 21. The forward end of the carriage 15 also terminates in an upstanding wall 22 that is provided with a shouldered opening 23 of such size as to receive a workpiece receiving and holding member 24 which will be described more in detail hereinafter. The rear member 21 may be provided with flanges (not shown) which bear against the upper surface of the carriage member 15 and be secured thereto by suitable bolts. Suitable mounting brackets (not shown) may also be attached to the forward wall 22 to secure the carriage member.

Spanning the rear end and front walls 21 and 22 of the carriage 15 is a pair of reinforcing spaced-apart guide rods constructed according to one above-referenced disclosure, one of which is shown at 28. The forward ends of the rods may be received in sockets formed in the forward wall 22, and the rearwards ends of the rods may have reduced, threaded end portions that pass through openings in the rear wall 21 and be fitted with threaded nuts. The rods 28 rigidify the walls 21 and 22.

Slidably mounted on the rods 28 is a combined workpiece feeding and clamping mechanism 32 which comprises a mounting base member 33 having a pair of bushing lined openings, only one of which is shown at 34, which receive the laterally spaced-apart respective rods 28 so as to permit the mechanism 32 to slide relatively to the carriage 15.

Forming part of the apparatus 32 and mounted atop the member 33 is a housing 36. Within and the forward end of the housing 36 is a yieldable mechanism for taking up a degree of movement of the carriage and disable movement of pressure pad or clamp 39 toward clamp member 135 and then subsequently moving clamp member 39 sufficiently to discharge a workpiece after it has been machined. The particular details of the yieldable mechanism will be described more fully hereinafter.

Figure 8:
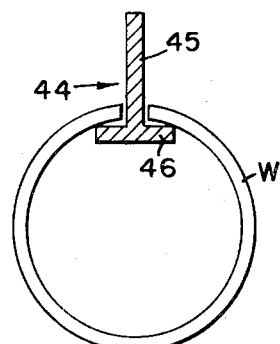
FIG. 8 is a sectional view, taken on line 8—8 of FIG. 3 and illustrating a detail of the apparatus.

The apparatus 32 is adapted to support workpieces W, such as split piston rings, arranged in a stack. Prior to being supported on the machine, each ring of a stack of rings is arranged so that its gap is aligned with the gap of each other ring. The rings then may be assembled on a workpiece support 44 (FIG. 8) which comprises an inverted T-shaped bar having a vertical flange 45 and a horizontal flange 46 having a width greater than the gap in each ring so as to permit the rings to be suspended from the flange 46 in the manner shown in FIG. 8. The workpiece support 44 is adapted removably to be mounted on the carriage 15 and comprises a depending tongue 47 at its rearward end which may be received in a slot 48 formed in the carriage member 21. An arm 49 (FIG. 3) is secured adjacent the forward end thereof. Adjusting screws 51 and 52 may be provided at the rearward and forward ends of the support 44 so as to enable the latter to be adjusted vertically relatively to the carriage 15. For convenience in handling the support 44, it may be equipped with a handle 53 in between its two ends.

Workpieces W supported on the member 44 are adapted to be positioned forwardly of the pad or clamp member 39 so as to enable the latter to push the entire stack of workpieces forwardly into the receiver 24. To avoid interference between the member 44 and the member 39, the latter is suitably notched to receive the flange 46 of the T-bar 44. The forward end of the supporting apparatus 44 terminates in a forwardly extending toe 55 (FIG. 3) which guides the workpieces W into the receiver 24.

The carriage 15 is adapted to be reciprocated longitudinally of the machine base 1 and the mechanism 32 is adapted to be reciprocated with and relatively to the carriage 15. The means for reciprocating the carriage 15 comprises an electric driving motor 60 (see FIG. 1) fixed on the frame member 6 and having its armature shaft 61 coupled to a rotatable camshaft 62 which is journaled for rotation in bearings 63 suspended from the frame member 4. Fixed on the shaft 62 is a rotatable cam 64 having a track 65 formed in its periphery and which receives the roller (FIG. 3) that depends from the member 16 of the carriage 15. The cam track 65 is so shaped that for each revolution of the cam the carriage 15 is reciprocated along a horizontal path having a length that preferably is somewhat greater than the thickness of the individual workpieces W. As the carriage 15 is reciprocated, the mechanism 32 moves therewith, but the apparatus includes means for effecting movement of the mechanism 32 forwardly relative to the carriage 15.

Figure 5:
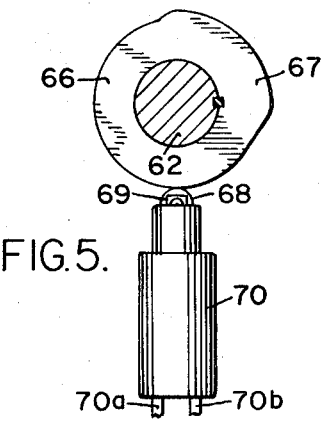
FIG. 5 is a sectional view, taken along lines 5—5 of FIG. 1, and illustrating a detail of the apparatus.

The means for indexing the mechanism 32 relatively to the carriage 15 comprises a cam 66 fixed on the camshaft 62 and having a radially projecting lobe 67 (see FIG. 5) that cyclically engages roller 68 journaled at the free end of plunger 69 of a conventional mechanically operated spring return directional valve 70. As will be described more fully hereinafter, depression of plunger 69 will permit fluid to flow via lines 70a and 70b to fluid motor 71 which is connected with the rearward end of shaft 75 by means of coupling 73. A support plate 73a (FIG. 2) is attached to wall 21 by suitable screws 73b. A support bracket 73c depends from plate 73a and includes motor mounting plates 73d on which motor 71 rests.

Threaded feed screw 75 is journaled at its forward end in a bearing 76 supported by the forward wall member 22 and adjacent its rearward end in a bearing assembly 77 that is supported in the rear wall member 21. The threaded portion of the screw 75 extends through a correspondingly threaded lug 78 which depends from the supporting member 33 of the mechanism 32, whereby rotation of the screw 75 will effect movement of the mechanism 32 longitudinally of the carriage 15.

If the pieces to be machined are one-eighth inch thick, ¼-inch threads 75a could suitably be cut on feed screw 75 so that one-half revolution of screw 75 would advance mechanism 32 relative to carriage 15 a distance of one-eighth inch. The amount of fluid passing through valve 70 each time lobe 67 engaged roller 68 would be sufficient to rotate motor 71 such that screw 75 would rotate substantially 180°, thereby controlling the indexing step with precision. The hydraulic system eliminates the need for a brake mechanism to prevent feed screw 75 from overrunning or coasting.

Figure 6:
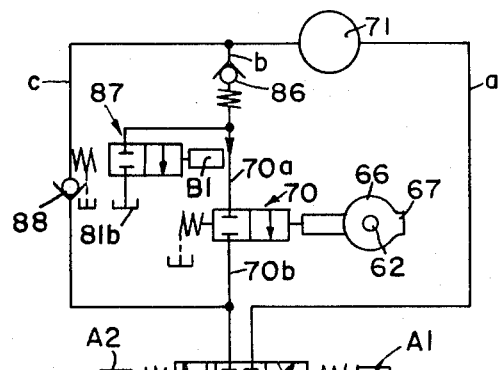
FIG. 6 is a schematic, fluid diagram of certain electrical parts of the apparatus.

As shown in FIG. 6, fluid is pumped to a four-way three-positioned solenoid operated directional valve 84 from a reservoir 81 through filter 82 by a pump 83 which is driven by a suitable power source such as an electric motor M. Valve 84 is in communicating relation with reservoir 81a. The standard valve No. OD4–DSHS–102–S, manufactured by Racine Hydraulics and Machinery, Inc. is well suited for this purpose. Solenoid A1 is utilized to move valve 84 to the crossover position which will set the system for forward operation and may be either manually or automatically energized. Solenoid A2 is effective to change the position of valve 84 to the "flow through" condition and is preferably energized by the closing of a limit switch after the desired number of workpieces have been machined. One side of the fluid motor 71 is connected with valve 84 by line a while the other side is connected with valve 84 by a pair of lines b and c. Line b includes a cam-operated spring return directional valve 70, connected with check valve 86 which is of the spring-return type requiring approximately 65 pounds of pressure to overcome the force of the spring. The standard valves, manufactured by Racine Hydraulics & Machinery, Inc. as Model NOS. OPZ–RTES–1 03–S and OBI–XOHP–104–N65 are well suited for valves 70 and 86, respectively. Connected between valves 70 and 86 is an override solenoid operated spring return valve 87 which communicates with reservoir 81b and which serves as a bypass valve in a manner to be described more fully hereinafter. Included in line c is check valve 88, which may suitably comprise standard valve LT–50 Gresson check valve, manufactured by Racine Hydraulics and Machinery, Inc.

The arrangement is such that with solenoid A1 energized, fluid will be permitted to flow from pump 83 through valve 84, through line a to motor 71. Fluid will be prevented from flowing through line c by check valve 88. If the pressure is sufficient to overcome the biasing force of the return spring of valve 86, fluid will be permitted to flow through line b to valve 70. Each time shaft 62 turns lobe 67 of cam 66 one complete revolution, the plunger 69 of valve 70 is actuated to permit fluid to flow through line b, valve 70, valve 84, and then to reservoir 81a. This, of course, completes the circuit and permits fluid to flow through motor 71 to turn feed screw 75. As soon as lobe 67 passes the follower roller 68, valve 84 will again block the flow of fluid through motor 71.

If it is desired that the workpieces be rapidly advanced by mechanism 32, motor 71 may be operated continually rather than intermittently by means of bypass valve 87. This operation is commonly referred to as the "jog" cycle and is effected by energizing solenoid B1 of bypass valve 87 to permit fluid to flow from motor 71 through check valve 86, through valve 87 and then to reservoir 81b. When the desired number of workpieces W have been machined, mechanism 32 may also be rapidly returned by energizing solenoid A2 of valve 84 to connect valve 88 with pump 83 through line c and also to motor 71 through line a to the reservoir 81a. This will drive motor 71 and hence screw 75 in the opposite direction, thereby returning mechanism 32 to its starting position.

Figure 7:
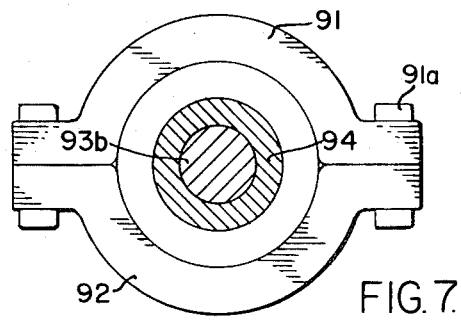
FIG. 7 is an enlarged, fragmentary, sectional view taken along lines 7—7 of FIG. 4.

Forming part of the yieldable mechanism atop and at the forward end of housing 36 is a cylinder 37 in which a sleeve 38, including collar portion 38a, is rigidly secured by press fit or other suitable means. Slidably received in bore 38b of collar 38 is a sleeve 89 having flanged collar portion 89a adjacent the rearward end thereof for engaging sleeve 38 when spring 90 lying in counter bore 89b, formed in sleeve 89 and bore 36a formed in housing 36 moves sleeve 38 in a forward direction to the position shown in FIG. 4. A retainer 36b preferably adjustable, is mounted on housing 36 to retain spring 90 in position. A half-round gauge 91 (FIGS. 4 and 7) is secured to the forward end of sleeve 89 by means of a half-round shaped cap 92, mounted on the lower half of sleeve 89. Bolts or other suitable clamping members, shown at 91a in FIG. 7, may be utilized to secure cap 92 and gauge 91 together.

Figure 2:
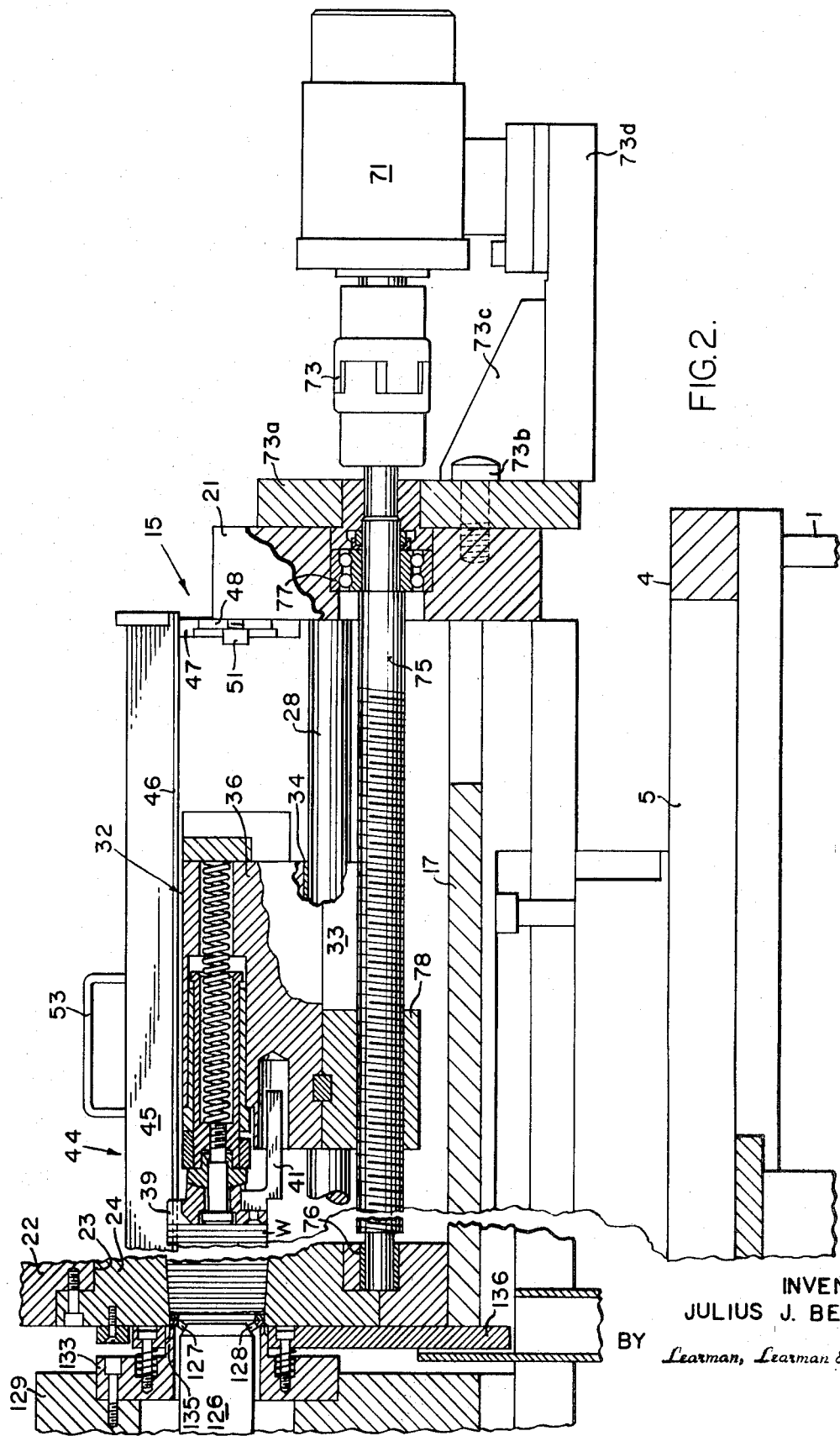
FIG. 2 is an enlarged, fragmentary, longitudinal, sectional view of the apparatus shown in FIG. 1.
Figure 4:
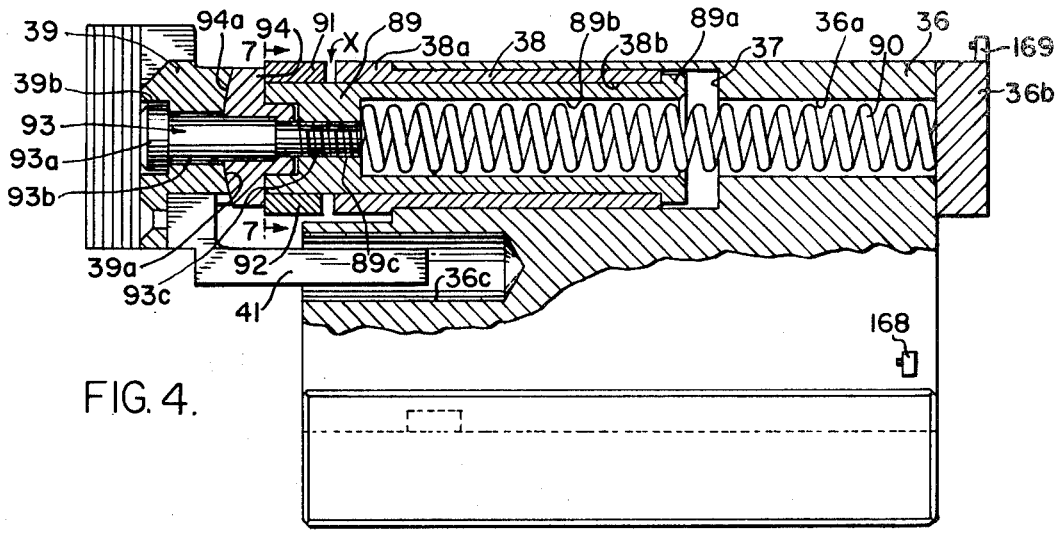
FIG. 4 is an enlarged, fragmentary, sectional view of the yieldable mechanism when the stack is in the unclamped position.

A stepped retaining pin 93 having a head 93a, body 93b, and reduced threaded portions 93c of increasingly smaller diameters is threadedly engaged to the threaded bore 89c formed in the end wall of sleet 89. A plunger 94, having a spherically shaped outer bearing surface 94a, is mounted adjacent the end of the main body portion of pin 93 and the end of sleeve 89. Mounted adjacent the pin head 93a is a pressure pad 39 having a spherically shaped bearing surface 39a complementally shaped to bear on surface 94a of plunger 94. As shown in the drawing, a slight play exists between the bore 39b and counterbore 39c formed in pressure pad 39 and the head 93a and body 93b of pin 93. This play and the spherical bearing relationship enables pressure pad 39 to exert a uniform outward pressure should the rearward portion of housing 36 become slightly canted. At the forward end of pressure pad 39 is mounted a rearwardly extending pin 41 slidably mounted in a bore 36c formed in the housing 36 so as to prevent rotation of pressure pad 39 relative to the housing, while permitting relative reciprocating movements of the sleeves therein. As will be described more fully hereinafter, pad 39 functions as a clamp to secure the stack of workpieces W during the machining operation. As can be seen in FIG. 4, a small distance X is provided between gauge 91 and the collar portion 38a of sleeve 38. When no pressure is exerted on pad 39, the assembly is in the position shown in FIG. 4. However, when the workpieces are clamped at the work station S and indexing apparatus moves mechanism 32 relative to carriage 15, the sleeve 89 slides rearwardly until gauge 91 engages collar portion 38a as shown in FIG. 2. The distance X is equal to the axial thickness of the workpiece to be machined, plus a few thousandths of an inch. As will be described more fully hereinafter, this relative movement permits spring 90 to disable further movement of pad 39 toward the work station and subsequently move the pad a distance equal to the thickness of the workpiece plus a slight increment, thereby enabling the outermost workpiece to fall from between the clamps.

The apparatus for indexing the mechanism 32 relatively to the carriage 15 functions in such manner that, for each revolution of the camshaft 62, the feed screw 75 is rotated an amount sufficient to cause the mechanism 32 to move forwardly relatively to the carriage 15 a distance that is at least as great as, and preferably slightly (0.002–0.004 of an inch, for example) greater than the maximum allowable thickness of an acceptable workpiece W. The rotation of the screw occurs after the stack of workpieces is clamped between clamps 39 and 135. The significance of this amount of time of movement of the mechanism 32 will be pointed out hereinafter At the forward end of the frame 1 secured to top wall 4 is a supporting structure similar to the supporting structure at the rear of the machine and which is constructed in accordance with the disclosure of the above-referenced patent. A fore-and aft-reciprocable carriage 100 which slidably receives housing 108 is adjustably slidably mounted on the supporting structure in accordance with the above-referenced patent disclosure. The carriage 100 includes a base member on which a follower roller (not shown), similar to the construction of the follower roller 19, is rotatably journaled, and is received in a cam track 105 that is formed in a cam 106 which is fixed to and rotates with the cam shaft 62. The construction and arrangement of the parts just described are such that the carriage reciprocates fore and aft of the frame in times relation to the reciprocation of the carriage 15 and for a purpose to be explained hereinafter.

The housing 108 is provided with a pair of horizontal mounting brackets 117 and 118 to which a support member 119 is secured by means of bolts or the like (FIG. 1). Fixed on the support 119 is a driving motor 121 having a rotatable armature shaft 122 to which is fixed a pulley 123. Around the pulleys 123 and 116 is trained a driving belt 124 by means of which one or more tools 127 and 128 may be rotated through suitable chuck 126 and drive means, as disclosed in the above-referenced patent.

Ahead of the carriage 100 is a rigid support member 129 (FIG. 3) secured to the frame 1. The member 129 is centrally bored as at 132 so as to accommodate the chuck 126 and its tools 127, 128. To the face of the member 129 is secured an annular clamp ring 133 (FIG. 3) by suitable screws 134, and the ring 133 is provided with a rearwardly extending, annular boss 135 having an internal diameter slightly greater than the internal diameter of each of the rings W, when the rings are compressed to eliminate the gap. Both of the members 129 and 133 are stationary and constitute a work station S. Preferably, the annular boss or clamp 135 is surrounded by a guide member 136 which fits slidably on the boss 135 and is mounted for movements back and for relative to the boss 135 by bolts 137. The guide member 136 normally is urged to the position shown in FIG. 3 by springs 137a which react between the members 133 and 136, and is adapted to cooperate with a member 136a fixed to the receiver 24 to provide a chip guard at the work station.

Reciprocation of the carriage 100 during rotation of the cam 106 effects simultaneous reciprocation of the housing 108 and the motor 121 so as to cause the cutting tools 127 and 128 to be fed to and withdrawn from the work station S. In order to adjust the position to which the tools 127 and 128 are advanced to the work station, the carriage 100 is provided with a laterally projecting bracket 138 on which is pivoted an arm 139 threadedly receiving a micrometer adjusting device 140 having a spindle 141 which is adapted to bear against a stop block 142 that is secured to and projects laterally from the housing 108. The position of the housing 108 may be adjusted relatively to the carriage 100 by manipulation of the micrometer apparatus 140, and the housing 108 then may be locked in adjusted position relative to carriage 100 by a suitable locking device.

In order to avoid any misalignment of the cutting tools and the workpieces, the frame member 129 may be provided with a pair of guide pins, one of which is shown at 149, which project beyond both sides of the frame member with the pins on one side of the frame member 129 being slidably received in guides (not shown) which are integrally formed on the housing 108, and the other ends of the guide pins being received in guide openings formed in the forward carriage member 22.

OPERATION

Figure 3:
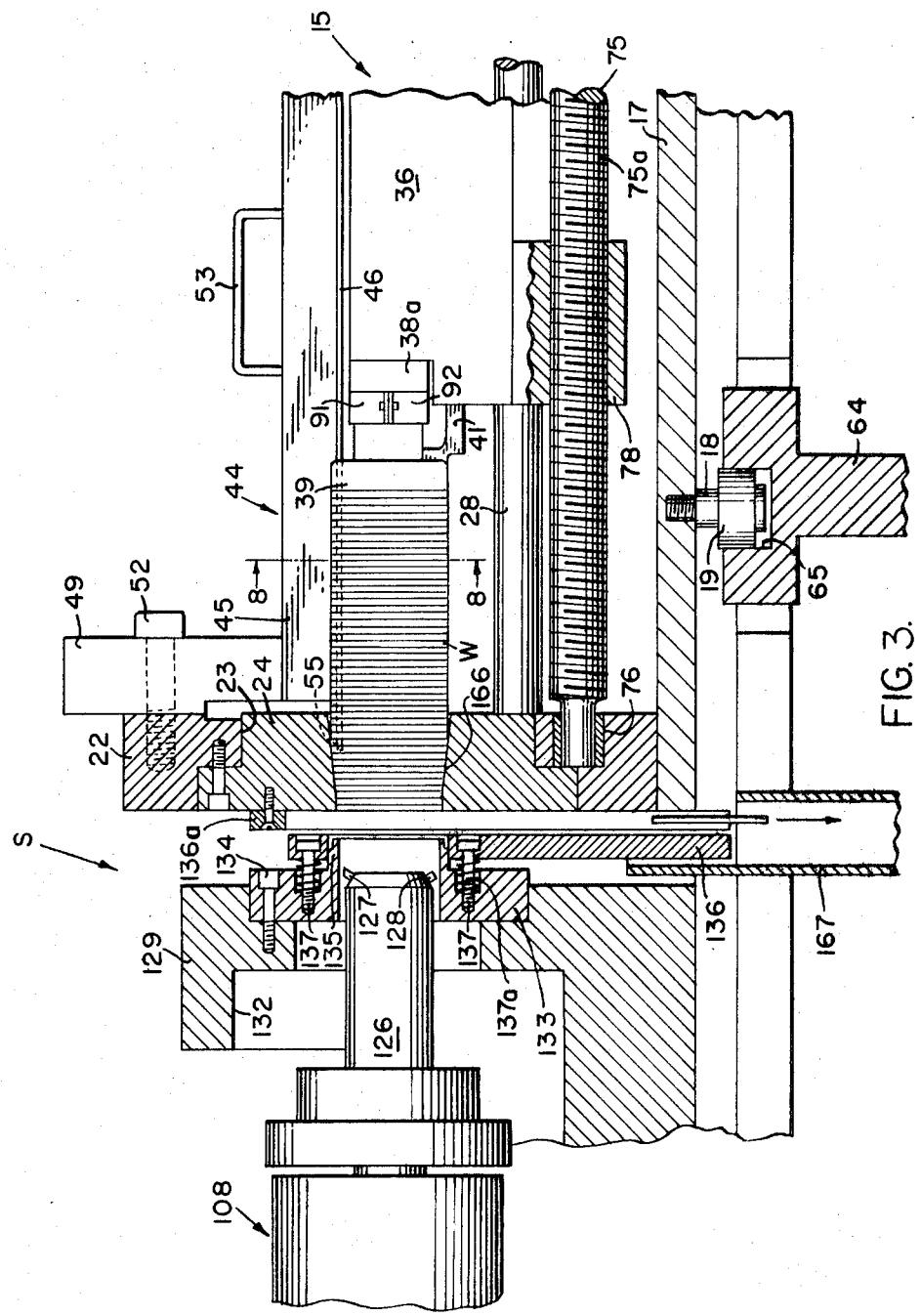
FIG. 3 is an enlarged, fragmentary, longitudinal, sectional view and similar to FIG. 2, but illustrating certain parts of the apparatus in adjusted positions.

When the apparatus is conditioned for operation, a stack of workpieces W, supported by the apparatus 44, will be suspended forwardly of the clamp member 39 and spring 90 will project the clamp 39 as far forwardly as is possible. Prior to starting the machine, the housing 108 will be adjusted relatively to the carriage 100 so as to limit the extent to which the cutting tools 127 and 128 may travel toward the work station S. The tool-driving motor 121 then may be started to effect rotation of the cutting tools 127 and 128 and the main driving motor 60 may be started to effect rotation of the cam shaft 62, whereupon the carriages 15 and 100 will be reciprocated simultaneously in opposite directions so as to move back and forth towards and away from the work station S. As the carriages 15 and 100 are reciprocated, the feed screw 75 will be rotated in increments so as to advance the workpiece supporting and feeding mechanism 32 incrementally toward the work station S. As the mechanism 32 advances toward the work station S, the workpiece at the left-hand end of the stack of workpieces will be introduced to the receiving member 24. Shortly after its introduction to the member 24, the end workpiece will be pushed off the toe 55 of the member 44 and be supported wholly by the member 24. As is shown in FIG. 3, the member 24 has a workpiece accommodating opening 166 of generally frustoconical shape and tapers toward the work station to a diameter such that a split ring located at the work station will have been squeezed together so as to close completely the gap between its ends. In this condition its bore is of true annular configuration and can be machined.

The reciprocating movements of the carriages 15 and 100 are controlled entirely by their respective cams 64 and 106. The timing of movement of the carriages should be such that the carriage 15 reaches its foremost position prior to the carriage 100 reaching such a position that the cutting tools 127 and 128 can engage the workpiece, so as to permit the end workpiece of a stack to be securely clamped between the clamp members 39 and 135 prior to the performance of cutting operations on the workpiece. Moreover, the cams 65 and 106 are so constructed that movement of the carriage 100 away from the work station S precedes movement of the carriage 15 away from the work station.

In the disclosed embodiment of the invention the cutting tool 127 is shaped bore the inner surface of the workpiece and the cutting tool 128 is shaped to provide a bevel edge on a workpiece. It should be understood, however, that other tools could be substituted for the tools 127 and 128.

Due to the relative movement between the mechanism 32 and the carriage 15, it is probably that the workpiece at the forward end of the stack will engage the clamp member 135 prior to the time the carriage 15 completes its movement in a forward direction. In such an event, pressure will be transmitted through the stack of workpieces and the clamp member 39 to the spring 90 which takes up a degree of movement of the carriage 15 and disables further movement of the clamp 39 toward the clamp 135, allowing the stack of workpieces to remain stationary at the work station, even though the carriage 15 continues to move forwardly, and avoids the imposition of damaging pressures on the workpieces or on the other parts of the apparatus.

Following the machining of the end workpiece of a stack, the carriages 15 and 100 move away from the work station S in the manner previously described, from the position shown in FIG. 2 to that shown in FIG. 3.

Prior to movement of the carriage 15 away from the work station S, the feed screw 75 is rotated in such direction as to advance the mechanism 32 relatively to the carriage 15 in a direction toward the work station S. The extent of relative movement of the mechanism 32 and the carriage 15 should be at least as great as the maximum thickness of an acceptable workpiece, such movement preferably is slightly greater than the maximum thickness of such a workpiece in order to assure expulsion of the machined workpiece at the end of the stack from the workpiece receiver 24. A workpiece so expelled from the receiver 2 falls by gravity through the slit formed in the frame member 4 and, if desired, a guide chute 167 (FIG. 3) may be supported by the frame to receive the successive workpieces and conduct them to a desired location. After a finished workpiece has been expelled from the receiver 24, the carriages 15 and 100 recycle and move toward one another in the same manner as has been described earlier. Thus, yieldable mounting means is provided for taking up a degree of movement of the carriage to disable further movement of the clamp member 39 toward clamp member 135, and also for moving clamp 39 toward clamp 135 a distance at least as great as the thickness of one of said workpieces when the two clamps are moved apart to permit a workpiece at the end of the stack to be discharged from between the clamp member.

It is preferred that the machine automatically cease operating and recondition itself for operation when a predetermined number of workpieces which may be less tn a complete stack has been machined. For this purpose the housing 36 of the mechanism 32 may include a normally closed switch 168 connected in the circuit of the driving motor 60 and adapted to stop the motor upon movement of the apparatus 32 a distance sufficient to effect engagement between the switch and the receiver 24.

A normally open limit switch 169 (FIG. 4) is also provided on housing 36 connected in the circuit of solenoid A2 of valve 84, and adapted to energize the solenoid upon movement of apparatus 32 a distance sufficient to effect engagement between the switch and receiver 24. This will operate to automatically reverse the drive of fluid motor 71 and cause it to return to its original starting position where the cycle may be repeated. A set of manually energized switch contacts may be connected in circuit with solenoid B1 of override bypass valve 87 to rapidly advance the stack workpieces to the work station S.

The disclosed embodiment is intended to be representative rather than definitive of the invention which is defined in the claims.

I claim:

1. A machine tool for successively machining workpieces comprising:

a frame having a work station thereon;

machining means at said work station;

a first clamp member mounted on said frame;

carriage means supported by said frame for movement toward and away from said first clamp member;

driving means for cyclically driving said carriage means first axially toward and then axially away from said first clamp member;

a second clamp member adapted to cooperate with said first clamp member to clamp a stack of workpieces therebetween;

means mounting said second clamp on said carriage means for movement with and relative thereto;

indexing means connected with said carriage means for incrementally indexing said mounting means toward said first clamp member; and yieldable means reacting between said second clamp member and said carriage means for taking up a degree of movement of said carriage means to disable further movement of said second clamp member toward said first clamp member, and for moving said second clamp member toward said first clamp member a distance at least as great as the axial thickness of one of said workpieces when said carriage means and said first clamp member are moved apart to axially discharge a workpiece at one end of said stack and permit it to be moved from a position between said clamp members.

2. A machine tool as set forth in claim 1 wherein said indexing means includes fluid motor means operated by said driving means to index said mounting means toward said first clamp means; and means operable to permit said motor means to move said mounting means toward said first clamp at a faster rate than said driving means along operates said motor means.

3. A machine tool as set forth in claim 1 wherein said yieldable means comprises energy storing yieldable means; said indexing means being operated by said driving means to index said mounting means toward said first clamp means while said stack of workpieces is clamped between said clamp members to transfer energy to said energy storing yieldable means and store it therein.

4. A machine tool as set forth in claim 3 wherein said indexing means includes power-operated means for moving said mounting means away from said first clamp means after said stack of workpieces has been machined by said machining means.

5. A machine tool as set forth in claim 3 wherein said indexing means includes fluid motor means, cam means, and cam follower means operably connected with said driving means to permit fluid to flow to said motor means.

6. A machine tool comprising:
a frame having a work station thereon;
a first clamp member mounted on said frame;
carriage means supported by said frame for sequential movement axially toward and away from said first clamp member;
driving means for cyclically driving said carriage means first axially toward and then axially away from said clamp member;
a second clamp member adapted to cooperate with said first clamp member to clamp a stack of workpieces therebetween;
energy storing yieldable means mounting said second clamp on said carriage means for movement with and relative to the latter, said energy storing yieldable means reacting between said second clamp member and said carriage means for
taking up a degree of movement of said carriage means toward said first clamp member to disable further movement of said second clamp member toward said first clamp member, and for
moving said second clamp member axially toward said first clamp member when said carriage means and said second clamp member are moved apart to axially discharge a workpiece at one end of said stack and permit it to be moved from between said clamp members; and
indexing means operated by said driving means and connected with said carriage means for moving said yieldable means relative to said carriage means to store energy in said yieldable means.

7. A machine tool as set forth in claim 6 wherein said indexing means is operable to move said carriage means relative to said yieldable means after said stack is clamped between said clamp members to increase the pressure exerted on said second clamp by said yieldable means.

8. A machine tool as set forth in claim 6 wherein said yieldable means moves said second clamp means toward said first clamp means a distance at least as great as the thickness of one of said workpieces.

9. A machine tool as set forth in claim 8 wherein said yieldable means comprises removably mounted gauge means for regulating the amount of movement between said carriage means and said second clamp.

10. A machine tool as set forth in claim 8 wherein said yieldable means includes spherical bearing means for transmitting the force between said yieldable means and said second clamp means.

11. Apparatus for successively presenting each workpiece of a stack of workpieces to tool means for machining said workpieces at a work station comprising:
clamp means for clamping said stack while a workpiece is being machines;
driving means for cyclically driving said clamp means toward and away from said work station;
carriage means sequentially movable toward and away from said work station;
energy storing yieldable means connecting said clamp means and said carriage means;
indexing means for moving said energy storing yieldable means relative to said carriage means to store energy in said energy storing yieldable means; said energy storing yieldable means being operable in response to movement of said carriage means away from said work station to axially discharge a workpiece at one end of said stack and permit it to be moved from a position between said clamp means.

12. Apparatus as set forth in claim 11 wherein said yieldable means comprises:
gauge means for regulating the amount of movement of said clamp means;
and spring means reacting between said clamp means and said carriage means.

13. Apparatus as set forth in claim 12 wherein said spring means is mounted in the bore of a receiver member which is slidably mounted on said carriage means.

14. Apparatus as set forth in claim 13 wherein said yieldable means further includes spherical bearing means connected with said receiver member for transmitting force to said clamp means.

15. A machine tool as set forth in claim 11 wherein said indexing means comprises fluid motor means operated by said driving means for moving said carriage means toward said work station.

16. A machine tool as set forth in claim 15 wherein said motor means operates to move said carriage means away from said work station after the stack of workpieces is machined.

17. A machine tool as set forth in claim 11 wherein said yieldable means includes removably connected gauge means for controlling the relative movement of said carriage means and said yieldable means.

18. A method of successively presenting each workpiece of a stack of workpieces to tool means for machining said workpieces, including a first clamp member and carriage means mounted on a frame, a second clamp member, a yieldable means mounting said second clamp on said carriage means comprising the steps of:
sequentially moving said carriage means and said second clamp member axially toward and away from said first clamp member to alternately clamp and unclamp said stack of workpieces between said clamp member;
taking up a degree of movement of said carriage means toward said first clamp member to disable further movement of said second clamp member toward said first clamp member;
moving said carriage means relative to said yieldable means while said stack is clamped between said clamp members for transferring energy to said yieldable means and storing it therein;
moving said second clamp member, by releasing the stored energy in said yieldable means, toward said first clamp member a distance at least as great as the axial thickness of one of said workpieces when said clamp members are moved apart to axially discharge a workpiece at one end of said stack and permit it to be moved from a position between said clamp members.

19. Apparatus for successively presenting each workpiece of a stack of workpieces to tool means for machining said workpieces at a work station comprising:
clamp means for clamping said stack while such a workpiece is being machined;
carriage means sequentially movable toward and away from said work station;
yieldable means connecting said clamp means and said carriage means;
driving means for cyclically driving said carriage means toward and away from said work station; and
indexing means for relatively moving said yieldable means and said carriage means, including:
fluid drivable motor means adapted to be connected in fluid circuit relation with a source of fluid under pressure;
means responsive to operation of said driving means for intermittently supplying said fluid under pressure to said motor means to intermittently drive said motor means and intermittently index said carriage in times relation with movement of said carriage means, and for then preventing the supply of fluid to, and simultaneously preventing the escape of fluid from, said motor means to positively break said motor means and prevent movement of said carriage.

* * * * *